Patented Aug. 29, 1950

2,520,150

UNITED STATES PATENT OFFICE 2,520,150

COMPOSITIONS COMPRISING AN ACRYLONITRILE POLYMERIZATION PRODUCT AND AN OXO-OXAZOLIDINE

Edward L. Kropa, Old Greenwich, and Walter M. Thomas, Springdale, Conn., assignors to American Cyanamid Company, New York, N. Y., a corporation of Maine No Drawing. Application March 31, 1949, Serial No. 84,728

8 Claims. (Cl. 260—30.4)

This invention relates to new and useful compositions of matter and more particularly to compositions comprising an acrylonitrile polymerization product and 5-chloromethyl-2-oxo-oxazolidine. The compositions of this invention in which the aforementioned oxazolidine substance is employed primarily as a solvent for the acrylonitrile polymerization product, in which case it constitutes a major proportion (more than 50%), e. g., from 55 to 95%, by weight of the composition, are particularly useful in the production of shaped articles therefrom, e. g., films, filaments, threads, rods, tubes and the like. 5-chloromethyl-2-oxo-oxazolidine also may be used as a plasticizer for an acrylonitrile polymerization product in which case it constitutes a minor proportion (less than 50%), e. g., from 0.5 to 45%, generally from 1 to 10% (especially when the polymerization product is in the form of a filament or thread), by weight of the composition.

Various methods of producing filaments, films and other shaped articles from polyacrylonitrile (polymeric acrylonitrile) and from copolymers or interpolymers of a major proportion of acrylonitrile and a minor proportion of another monomer or monomers, e. g., a polymerization product containing in the polymer molecules an average of at least 85% by weight of acrylonitrile, heretofore have been suggested. For example, in Rein U. S. Patent No. 2,117,210 it is proposed that polyacrylonitrile be dissolved in a quaternary ammonium compound, more particularly a pyridinium compound such as benzyl pyridinium chloride, and that the resulting solution be employed in making films, threads and other shaped bodies therefrom. Also, in Rein U. S. Patent No. 2,140,921 it is proposed that various polyvinyl compounds including polyacrylonitrile and copolymers of acrylonitrile with another vinyl compound be dissolved in concentrated aqueous solutions of inorganic (metal) salts, e. g., the chlorides, bromides, iodides, thiocyanates, perchlorates and nitrates, and that the resulting solutions be used in the manufacture of threads, films, etc.

The present invention is based on our discovery that polymers and copolymers of acrylonitrile, more particularly polymeric acrylonitrile and thermoplastic copolymers of acrylonitrile, specifically such copolymers containing in their molecules an average of at least 85% by weight of acrylonitrile, e. g., copolymers of, by weight, from 85 to 99.5% of acrylonitrile and another monomer such, for instance, as vinyl acetate, methyl acrylate, ethyl acrylate, acrylamide, etc., are compatible with 5-chloro-methyl-2-oxo-oxazolidine and that this oxazolidine compound is capable of dissolving the acrylonitrile polymerization product to yield solutions which are suitable for use in making mono- and multifilaments, threads, yarns, bars, films, etc., therefrom. The invention is based on our further discovery that the aforementioned oxazolidine compound is able effectively to plasticize acrylonitrile polymerization products, so that the latter more easily can be shaped, as by extrusion or molding, into useful articles of manufacture. The oxazolidine substance employed in practicing our invention may be used either as a fugitive or temporary plasticizer, that is, a plasticizer which subsequently is removed from the polymerization product, or as a permanent plasticizer which is permitted to remain in the shaped polymer or copolymer.

5-chloromethyl-2-oxo-oxazolidine is water-soluble and does not cause decomposition of, nor appear to react chemically with, the acrylonitrile polymerization product. Furthermore, it can be partially or substantially completely removed from films, threads, or other shaped bodies which are produced from the solution, as may be desired or as conditions may require. The solution of the polymerization product is stable over a long period of time.

5-chloromethyl-2-oxo-oxazolidine is prepared, for instance, by effecting reaction between potassium cyanate and ethylene epicholorohydrin in accordance with the following equation:

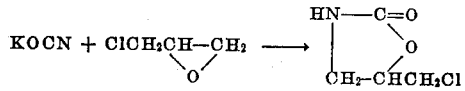

[Reference: Knorr and Rössler, Ber. 36, 1281 (1903).]

5-chloromethyl-2-oxo-oxazolidine is a solid substance having a melting point of about 104° C. When melted and heated to a temperature above its melting point, it is capable of dissolving acrylonitrile polymerization products containing in the polymer molecules an average of at least 85% by weight of acrylonitrile. In dissolving the acrylonitrile polymerization product it is usually desirable to employ the lowest possible temperature above the melting point of the said oxazolidine and which is consistent with practical considerations, e. g., the time required for effecting solution, etc.

Polymeric acrylonitrile and acrylonitrile copolymers containing in the polymer molecules an average of at least 85% by weight of acrylonitrile are employed in carrying the present invention into effect. These polymers and copolymers are prepared by methods now well known to those skilled in the art. In some cases the polymerization rates of the individual monomers in a polymerizable mixture may be different, with the result that the proportions of the components in the final copolymer are different from the proportions thereof in the mixture of monomers which is polymerized. The proportions of monomers in the polymerizable mixture therefore preferably are adjusted, in practicing the present invention, so that the final copolymer contains in the molecules thereof an average of at least 85% by weight of acrylonitrile. The expression "polymerization product containing in the polymer molecules an average of at least 85% by weight of acrylonitrile," as used herein and in the appended claims, means a polymerization product (polymer, copolymer or interpolymer or mixtures thereof) containing in their molecules an average of at least 85% by weight of the acrylonitrile unit, which is considered to be present in the individual polymer molecule as the group

or, otherwise stated, at least 85% by weight of the reactant substance converted into and forming the polymerization product is acrylonitrile.

Illustrative examples of monomers which may be copolymerized with acrylonitrile to yield a polymerization product (copolymer or interpolymer) containing in the polymer molecules an average of at least 85% by weight of acrylonitrile are compounds containing a single

grouping, for instance the vinyl esters and especially the vinyl esters of saturated aliphatic monocarboxylic acids, e. g., vinyl acetate, vinyl propionate, vinyl butyrate, etc.; vinyl and vinylidene halides, e. g., the vinyl and vinylidene chlorides, bromides and fluorides; allyl-type alcohols, e. g., allyl alcohol, methallyl alcohol, and other unsaturated monohydric alcohols such as are disclosed, for example, in Pfann and Kropa copending application Serial No. 738,736, filed April 1, 1947; allyl, methallyl and other unsaturated monohydric alcohol esters of monobasic acids, e. g., allyl and methallyl acetates, laurates, cyanides, etc.; acrylic and alkacrylic acids (e. g., methacrylic, ethacrylic, etc.) and esters and amides of such acids (e. g., methyl, ethyl, propyl, butyl, etc., acrylates and methacrylates, acrylamide, methacrylamide, N-methyl, -ethyl, -propyl, -butyl, etc., acrylamides and methacrylamides, etc); methacrylonitrile, ethacrylonitrile and other hydrocarbon-substituted acrylonitriles; unsaturated aliphatic hydrocarbons containing a single

grouping, e. g., isobutylene, etc.; and numerous other vinyl, acrylic and other compounds containing a single

grouping which are copolymerizable with acrylonitrile to yield thermoplastic copolymers. Alkyl esters of alpha,beta-unsaturated polycarboxylic acids also may be copolymerized with acrylonitrile to form copolymers which are useful in practicing the present invention, e. g., the dimethyl, -ethyl, -propyl, -butyl, etc., esters of maleic, fumaric, citraconic, etc., acids.

The proportions of monomers in the polymerizable mixture may be varied as desired or as may be required in order to obtain a polymerization product containing in the polymer molecules an average of at least 85% by weight of acrylonitrile. Thus, when the polymerization rate of the monomers present in the polymerizable mixture is substantially the same, the proportions may be, for example, from, by weight, about 85% to about 99% of acrylonitrile to from about 15% to about 1% of the other comonomer. When the polymerizable mixture contains, in addition to the acrylonitrile, a monomer such, for example, as vinyl chloride, allyl alcohol, etc., which polymerizes at a rate different from that of acrylonitrile, then it may be necessary to subject to polymerization conditions a mixture in which the acrylonitrile constitutes as little as, for instance, 50 or 60% by weight thereof in order to obtain a polymerization product containing in the copolymer molecules an average of at least 85% by weight of acrylonitrile.

Any suitable method of polymerizing the monomeric acrylonitrile or mixture of monomers may be employed. One suitable method comprises polymerizing the monomer or mixture of monomers in an aqueous emulsion using a suitable polymerization catalyst, e. g., ammonium persulfate. Other polymerization methods, however, also may be used, e. g., methods such as those described in Bauer et al. U. S. Patent No. 2,160,054. The polymeric and copolymeric acrylonitriles used in practicing our invention may be of any suitable molecular weight, but ordinarily the molecular weight (average molecular weight) is within the range of 15,000 to 300,000 or higher, and advantageously is of the order of 35,000 or 40,000 to 140,000 or 150,000, as calculated from viscosity measurements using the Staudinger equation (reference: U. S. Patent No. 2,404,713).

The dissolution of the acrylonitrile polymerization product in the molten 5-chloromethyl-2-oxo-oxazolidine is accelerated by using a polymer or copolymer which is in finely divided state, e. g., one which, if not in finely divided state as originally formed, has been ground so that all or substantially all of it will pass through a U. S. Standard Sieve Series No. 50 screen. It also is usually desirable to agitate the mass, as by mechanical stirring, while dissolving the polymerization product in the solvent.

The proportions of the acrylonitrile polymerization product and 5-chloromethyl-2-oxo-oxazolidine in the compositions of our invention may be varied widely, depending mainly upon the particular use for which the composition is intended. If the oxazolidine is employed primarily as a solvent for the polymer or copolymer so as to obtain a film, filament, thread, yarn, rod, tube or other shaped article from which all or substantially all of the solvent subsequently is removed, then the acrylonitrile polymerization product usually constitutes at least 5% but less than 50%, e. g., from 5 to about 20 or 25%, by weight of the composition. If the solution is to be used in the spinning of filaments (mono- or multifilaments) or the casing of films, it is generally preferred that the polymer or copolymer constitute at least 7 or 8%, e. g., from 10 to 20 or 25%, by weight of the composition. The aforementioned ranges of proportions are mentioned as indicative of suitable proportions that may be employed in forming solutions of the polymerization product, and our invention obviously is not limited to the use of only such proportions. Especially in spinning and casting applications of the compositions, the important factor is that the proportions be such that the viscosity of the composition at the operating temperature is within a workable range. Satisfactory viscosities at the operating temperatures usually prevail when the polymer or copolymer constitutes from 7 or 8% up to 15 or 18% by weight of the composition, but this also is dependent upon the average molecular weight of the polymerization product which may range, for example, from 15,000 or 20,000 up to 150,000 or 200,000, or even as high as 250,000 or 300,000 or more, as determined from viscosity measurements and calculations by the Staudinger equation.

Because the use of the higher amounts of solvent renders spinning operations more costly and difficult due to the trouble often encountered in rapidly removing large amounts of solvent from the solution and due to the cost of such removal, even though the solvent be recovered, it is preferable to use a polymerization product having a molecular weight such that a maximum amount of the polymer or copolymer, consistent with the viscosity of the solution at the operating temperature, can be dissolved in the oxazolidine substance. By using acrylonitrile polymerization products having an average molecular weight (Staudinger method) within the range of 35,000 or 40,000 up to 150,000 or 160,000, it is possible to obtain solutions containing from 10 to 25% by weight thereof of the polymer or copolymer, and having suitable viscosities for use at operating temperatures of the order of 130° to 180° C. or 200° C. or higher.

The solutions described above may be used in the production of various fabricated structures such, for example, as films, filaments, bars, rods, tubes, etc., in accordance with general techniques and using apparatus now generally known to those skilled in the art, the detailed operating conditions being suitably modified where required.

In making extruded articles such, for example, as filaments, etc., the solution heated to, for instance, 110° to 180° C. or higher, is extruded through a spinneret or die into a liquid coagulating bath which will coagulate the polymerization product in the spinning solution. The liquid into which the spinning solution is extruded is one which is miscible with the oxazolidine substance and which, as a result of extracting the solvent, is capable of coagulating the polymerization product. Any liquid which is thus capable of coagulating the polymer or copolymer may be employed, but preferably the liquid coagulant is one which has no harmful effect upon the polymerization product. Examples of liquid coagulants that can be used at room temperature are ethylene glycol monomethyl ether, ethylene glycol monoethyl ether, acetonitrile, acetone, pyridine and morpholine. If the liquid coagulant is to be used hot (i. e., at 50°–90° C. or higher), the foregoing liquids and others such as water, ethylene glycol, glycerol or ethylene chlorohydrin can be employed.

It will be understood, of course, by those skilled in the art that the temperature of the liquid coagulating or precipitating bath should be such as to dissolve the solvent from the extruded mass most rapidly and effectively. The length of travel of the shaped article through the bath may be varied as desired or as conditions may require, but in all cases should be sufficiently long to effect solidification of the polymerization product and to extract from the extruded mass all of the solvent, or, if desired, only a part of it, leaving the remainder, e. g., from 0.5% to 10% by weight of the whole, in the extruded mass so that it may function as a plasticizer for the polymerization product. One or more sheaves or rolls may be positioned in the bath so as to guide the filament during its formation and to keep it under tension thereafter.

The spun filament or other extruded article is preferably treated in, or after leaving, the coagulating bath in order to orient the molecules and thereby to increase the tensile strength and otherwise to improve the properties of the spun material. Orientation may be effected by stretching the thread or strand at any suitable stage of the spinning operation, but preferably while the spun filament or thread still contains at least some of the solvent. Stretching may be accomplished by passing the thread or yarn between two or more positively driven rollers or godets, the peripheral speeds of which are adjusted so that the thread is stretched to the desired degree.

The amount of stretch that is applied to the filament or strand may be varied widely, but in all cases should be sufficient to cause at least appreciable orientation of the molecules and an improvement in the properties of the material undergoing treatment. The amount of tension to which the strand is subjected obviously should not be so great as to cause it to break. Depending, for example, upon the type or kind of material being stretched and the particular properties desired in the finished product, the amount of stretch may vary, for instance, from 100%, preferably from 200 or 300%, up to 1000% or more of the original length of the filament or strand. The stretch may be applied gradually by passing the thread over a plurality of godets having increasing peripheral speeds. The stretched thread may be wound upon a spool or it may be collected in a centrifugal pot, whereby twist advantageously is applied to the thread. Alternatively, the stretched thread may be led over a thread-storage device on which it may be treated with water or other suitable solvent to remove all or part of the coagulant and/or oxazolidine substance, after which it may be continuously dried, oiled and taken up on a twisting device such, for instance, as a ring twisting spindle.

The extruded filament or thread may be given part or all of its total stretch in a liquid medium such as that which constitutes the coagulating bath, or in any other suitable medium, and at a suitable temperature. Thus, the stretch may be applied while the strand is being passed through a gaseous medium, e. g., air, nitrogen, flue gases, etc., or through a liquid medium, e. g., water, or such media as are employed for coagulating the polymerization product. To obviate or minimize discoloration of the polymerization product, the temperature of the medium in which the polymer or copolymer is stretched and the rate of travel of the strand through the medium should be so adjusted that overheating of the strand does not occur. Ordinarily the temperature of the medium in which stretching is effected is below 200° C., e. g., at 110° to 140° C.

The highly stretched product is strong, tough and pliable and shows a high degree of orientation along the fiber axis by X-ray diffraction.

The solvent solutions of the acrylonitrile polymerization product also can be cast in the form of films. For instance, the hot, liquid composition may be cast upon a revolving drum which is partly immersed in a coagulating bath, such as mentioned hereinbefore, and which will serve to deposit the polymerization product as a thin film on the drum as it passes through the bath. The resulting film may be stretched, if desired, lengthwise and crosswise by suitable apparatus to improve its properties.

As indicated hereinbefore, the spinning operation can be so conducted as to leave a small amount of the oxazolidine substance in the polymerization product as a plasticizer therefor. Other means, however, also can be employed for plasticizing a polymer or copolymer of acrylonitrile with 5-chloromethyl-2-oxo-oxazolidine. For example, a water-swollen filament or thread of polymeric or copolymeric acrylonitrile which has been produced as described in Cresswell copending application Serial No. 772,200, filed September 4, 1947, can be treated as by immersion, with an aqueous or other solution of the oxazolidine substance. Or, the 5-chloromethyl-2-oxo-oxazolidine can be dissolved in an organic solvent, e. g., acetone, morpholine, ethylene glycol monoethyl ether, and others such as previously have been mentioned, and this solution then can be used in treating the water-swollen, stretched or unstretched thread. Since some of the materials which are solvents for 5-chloromethyl-2-oxo-oxazolidine also are capable of functioning as humectants in preserving the gel structure of a water-swollen polymer or copolymer of acrylonitrile as disclosed and claimed in Cresswell copending application Serial No. 772,202 and copending application Serial No. 772,217 of John D. Pollard, both filed September 4, 1947, the treatment with the oxazolidine plasticizer advantageously can be combined with the humectant treatment of the water-swollen or gelled product. Thus, instead of using ethylene glycol, glycerol or other humectant, or mixtures thereof, alone in treating the water-swollen film, thread, etc., the aforementioned oxazolidine dissolved in a solvent, which also can function as a humectant, can be applied, as by immersion, to the water-swollen polymer or copolymer. The humectant-solvent then can be removed, as by the use of a preferential solvent, from the stretched or unstretched, dyed or undyed, gelled polymerization product, leaving the aforesaid oxazolidine as a permanent plasticizer in the finished product.

In order that those skilled in the art better may understand how the present invention can be carried into effect, the following examples are given by way of illustration and not by way of limitation. All parts and percentages are by weight.

*Example 1*

Into about 100 parts of molten 5-chloromethyl-2-oxo-oxazolidine is dropped about 5 to 10 parts of powdered polyacrylonitrile. The finely divided polymer dissolves in the molten chloromethyl-oxo-oxazolidine at 120°–140° C. On cooling, a soft gel first forms and then crystals of the solvent appear. A clear solution of dissolved polyacrylonitrile is again obtained upon reheating the mass.

Upon extruding the above solution at 135° C. through a spinneret into a coagulating bath of ethylene glycol maintained at 120° C., a filament or thread of polymeric acrylonitrile is formed. Films are produced when the hot solution is poured onto a warm surface such as glass, followed by immersion in a hot solvent for the 5-chloromethyl-2-oxo-oxazolidine, for instance ethylene glycol at 120°–140° C.

*Example 2*

Same as Example 1 with the exception that the copolymer employed is a copolymer of acrylonitrile and allyl alcohol containing an average of about 96.4% of acrylonitrile combined in the copolymer molecules. Substantially the same results are obtained, the 5-chloromethyl-2-oxo-oxazolidine also being a good solvent for this copolymer.

*Example 3*

Same as Example 1 with the exception that the copolymer employed is a copolymer of approximately 90% acrylonitrile and 10% acrylamide. The results are substantially the same. In this case, too, the 5-chloromethyl-2-oxo-oxazolidine is a good solvent for the copolymer.

*Example 4*

A filament or fiber produced from 5-chloromethyl-2-oxo-oxazolidine and polyacrylonitrile in the manner described under Example 1 and which contains a small amount of the order of 3% of 5-chloromethyl-2-oxo-oxazolidine is stretched about 500% to orient the molecules along the fiber axis, yielding a plasticized oriented filament of polyacrylonitrile.

It will be understood, of course, by those skilled in the art that our invention is not limited to the specific proportions of ingredients, operating conditions and procedures given in the above illustrative examples. Likewise, polymerization products other than those given in the examples may be used. For instance, instead of the particular copolymers of acrylonitrile and allyl alcohol and of acrylonitrile and acrylamide employed in the examples, we may use such copolymers in which the acrylonitrile is present in the copolymer molecules in other proportions within the range of, for example, an average of 85% to 99% or more, or other copolymers of acrylonitrile and another monomer, numerous examples of which have been given hereinbefore, and in which the acrylonitrile constitutes at least 85% of the copolymer molecule.

Likewise, instead of extruding the liquid solution through a spinneret as described in some of the examples, a homogeneous, intimate mixture of the polymerization product and the solid 5-chloromethyl-2-oxo-oxazolidine can be fed into a worm-fed extruder, wherein it is melted and homogenized, and thereafter extruded in the desired shape, e. g., as a monofilament, tape, bar, rod, etc., into a suitable liquid coagulant (examples of which previously have been given), maintained at a suitable temperature, e. g., ethylene glycol at a temperature of 125°–180° C. The extruded article is then stretched to orient the molecules and to impart strength and toughness to the shaped object. The coagulating liquid containing the oxazolidine dissolved therein is then cooled until the oxazolidine crystallizes out, after which the latter is separated, as by filtration or centrifuging, and re-used in the process.

From the foregoing description it will be seen that the present invention provides compositions comprising an acrylonitrile polymerization product (polymer, copolymer or interpolymer) and 5-chloromethyl-2-oxo-oxazolidine either as a plasticizer or as a solvent therefor.

Instead of using 5-chloromethyl-2-oxo-oxazolidine alone as a plasticizer or solvent for acrylonitrile polymerization products of the kind with which the present invention is concerned, we can use the said oxazolidine in combination with other known solvents or plasticizers for a polymer or copolymer of acrylonitrile. For instance, as a solvent for the aforementioned acrylonitrile polymerization product, we can use a concentrated aqueous solution containing a mixture of the hereindescribed oxazolidine and a water-soluble inorganic salt (or plurality of such salts), more particularly such a salt or salts which yield highly hydrated ions in aqueous solution, e. g., the chlorides, bromides, thiocyanates, perchlorates and nitrates, which salts are disclosed, for example, in the aforementioned Rein Patent No. 2,140,921. More specific examples of such water-soluble inorganic salts are zinc chloride, calcium chloride, lithium bromide, cadmium bromide, cadmium iodide, sodium thiocyanate, zinc thiocyanate, aluminum perchlorate, calcium perchlorate, calcium nitrate, zinc nitrate, etc. Examples of other salts that can be used in combination with 5-chloromethyl-2-oxo-oxazolidine in carrying the present invention into effect, more particularly in the form of an aqueous solution as a solvent for the hereindescribed polymers and copolymers of acrylonitrile, are guanidine thiocyanate, the mono-(lower alkyl)-substituted guanidine thiocyanates and the symmetrical and unsymmetrical di-(lower alkyl)-substituted guanidine thiocyanates, which salts are more fully described (including their use as solvents for acrylonitrile polymerization products) in Cresswell copending application Serial No. 772,201, filed September 4, 1947.

The compositions of this invention can be shaped or fabricated, as by extrusion, molding, casting, etc., into a wide variety of useful articles. Lubricants, anti-static agents and other conventional modifiers of acrylonitrile polymerization products can be incorporated therein at any suitable stage of the operation. Other and more specific examples of modifiers that can be employed are given in the aforementioned Cresswell copending applications, as well as in the prior art patents hereinbefore acknowledged. Compositions containing, for example, from 3 to 50% by weight of the aforementioned oxazolidine and the remainder an acrylonitrile polymer or copolymer of the kind described above can be molded under heat and pressure to provide a wide variety of shaped, plasticized acrylonitrile polymerization products.

Although not limited thereto, the compositions of this invention are particularly useful in the production of filaments, threads, yarns, etc., which thereafter are woven into fabrics. Other uses include those given in the aforementioned patents.

The term "filament" as used generically herein and in one of the appended claims is intended to include within its meaning both monofilaments and multifilaments.

We claim:

1. A composition of matter comprising (1) a polymerization product containing in the polymer molecules an average of at least 85% by weight of acrylonitrile and (2) 5-chloromethyl-2-oxo-oxazolidine.

2. A composition as in claim 1 wherein the polymerization product is polymeric acrylontrile.

3. A composition as in claim 1 wherein the polymerization product of (1) has an average molecular weight within the range of 15,000 to 300,000.

4. A composition as in claim 1 wherein the polymerization product of (1) constitutes at least 5% by weight of the composition.

5. A composition adapted for the production of films, filaments, threads, rods, tubes and the like comprising 5 - chloromethyl - 2 - oxo-oxazolidine having dissolved therein a polymerization product containing in the polymer molecules an average of at least 85% by weight of acrylonitrile, said polymerization product constituting from about 5% to about 25%, by weight, of the total amount of polymerization product and 5-chloromethyl-2-oxo-oxazolidine.

6. A plasticized composition comprising a polymerization product containing in the polymer molecules an average of at least 85% by weight of acrylonitrile, said polymerization product being plasticized with a plasticizing amount not substantially exceeding 10% by weight of the composition of a plasticizer comprising 5-chloromethyl-2-oxo-oxazolidine.

7. A polymerization product containing in the polymer molecules an average of at least 85% by weight of acrylonitrile, said polymerization product being plasticized with from 1 to 10% by weight of the whole of 5-chloromethyl-2-oxo-oxazolidine.

8. A filament which shows orientation along the fiber axis and which comprises a polymerization product containing in the polymer molecules an average of at least 85% by weight of acrylonitrile, said polymerization product being plasticized with from 1 to 10% by weight of the whole of 5-chloromethyl-2-oxo-oxazolidine.

EDWARD L. KROPA.
WALTER M. THOMAS.

REFERENCES CITED

The following references are of record in the file of this patent:

UNITED STATES PATENTS

| Number | Name | Date |
| --- | --- | --- |
| 2,463,829 | Tryon | Mar. 8, 1949 |